350-317 04-18-72 XR 3,657,474 SR

United States Patent

Turnrose

[15] 3,657,474

[45] Apr. 18, 1972

[54] PSYCHEDELIC DEVICE ATTACHABLE TO FRONT OF TELEVISION TUBE

[72] Inventor: Paul H. Turnrose, 84 Overlook Avenue, Forestville, Conn. 06011

[22] Filed: Apr. 13, 1970

[21] Appl. No.: 27,614

[52] U.S. Cl. ....... 178/7.86, 313/112, 350/317, 350/318, 350/319, 353/75, 353/84, 353/97

[51] Int. Cl. ....... H04n 5/72, H01j 61/40

[58] Field of Search ....... 178/7.85, 7.86; 313/112; 350/317, 318, 319; 353/1, 75, 84, 97

[56] References Cited

UNITED STATES PATENTS

| | | | |
|---|---|---|---|
| 3,012,461 | 12/1961 | McCall | 350/317 |
| 78,408 | 5/1868 | Wing | 353/97 |
| 2,254,057 | 8/1941 | Arni | 178/7.85 |
| 3,561,850 | 2/1971 | Shaffer | 178/7.86 |

FOREIGN PATENTS OR APPLICATIONS

| | | | |
|---|---|---|---|
| 682,760 | 11/1952 | Great Britain | 350/317 |

*Primary Examiner*—Robert L. Griffin
*Assistant Examiner*—Joseph A. Orsino, Jr.
*Attorney*—Harbaugh and Thomas

[57] ABSTRACT

The disclosure describes a psychesthetic device for attachment to a television screen or tube face for the production of moving variously colored light patterns for direct or indirect visual observation. The device includes, in one embodiment, a panel of essentially opaque material having a plurality of spaced projections with thin-walled bottoms on the outside with or without a layer of irregular shaped multi-colored translucent panels on the inside of the panel. In one embodiment the panel is pigmented plastic so as to transmit only high levels of light intensity except at the ocular end of the projection where it is thinned in the molding process so as to relatively translucent or transparent to low levels of light intensity. Colored light from the television tube, is transmitted through the projections and the color pattern of the transmitted light is modified and transformed by the projections into an ever-changing light pattern with the ocular end of each projection acting as a picture element or point of light diffusion in the pattern. With the room lights and the television sound turned off, the psychesthetic light pattern is produced. The layer of multi-colored translucent panels or colored oculars are used in the combination with either colored or black and white television sets to produce similar effects.

7 Claims, 6 Drawing Figures

350/DIG

Patented April 18, 1972

3,657,474

2 Sheets-Sheet 1

INVENTOR
PAUL H. TURNROSE
By Harbaugh & Thomas
Attorneys

INVENTOR
PAUL H. TURNROSE

By Harbaugh & Thomas
Attorneys

PSYCHEDELIC DEVICE ATTACHABLE TO FRONT OF TELEVISION TUBE

BACKGROUND OF THE INVENTION

Moving filter screens have been used in front of television tubes which cooperate in synchronizing relationship to convert black and white television pictures to colored pictures with the primary purpose of producing a recognizable image. The art refers to this as mechanical field sequential television color systems. Multi-colored plates have been used in combination with contiguous apertured plates having minute transparent holes across the surface. The effect of these devices is not psychedelic because the apertures become indistinguishable to the viewer, and merely change the color of the total area when the device is vibrated. Combinations of a viewing screen and means to project multi-colored lights thereon the intensities of which are synchronized with the sound intensities are also known. Such devices are truly psychedelic but employ mechanisms to produce motion of the parts and sound variation circuitry which complicates the structures. Others in this art employ rotating discs, prism-shaped elements and color correction filters which produce different effects not related to psychesthetic phenomena.

The instant invention concerns a device to be used with either black and white or colored television screens that is simple to use, has no complicated or moving parts and produces an unusual psychesthetic effect.

DESCRIPTION OF THE DRAWINGS

An illustrative embodiment of the invention is shown in the drawings wherein.

THE PREFERRED EMBODIMENT

Figures 1, 2:
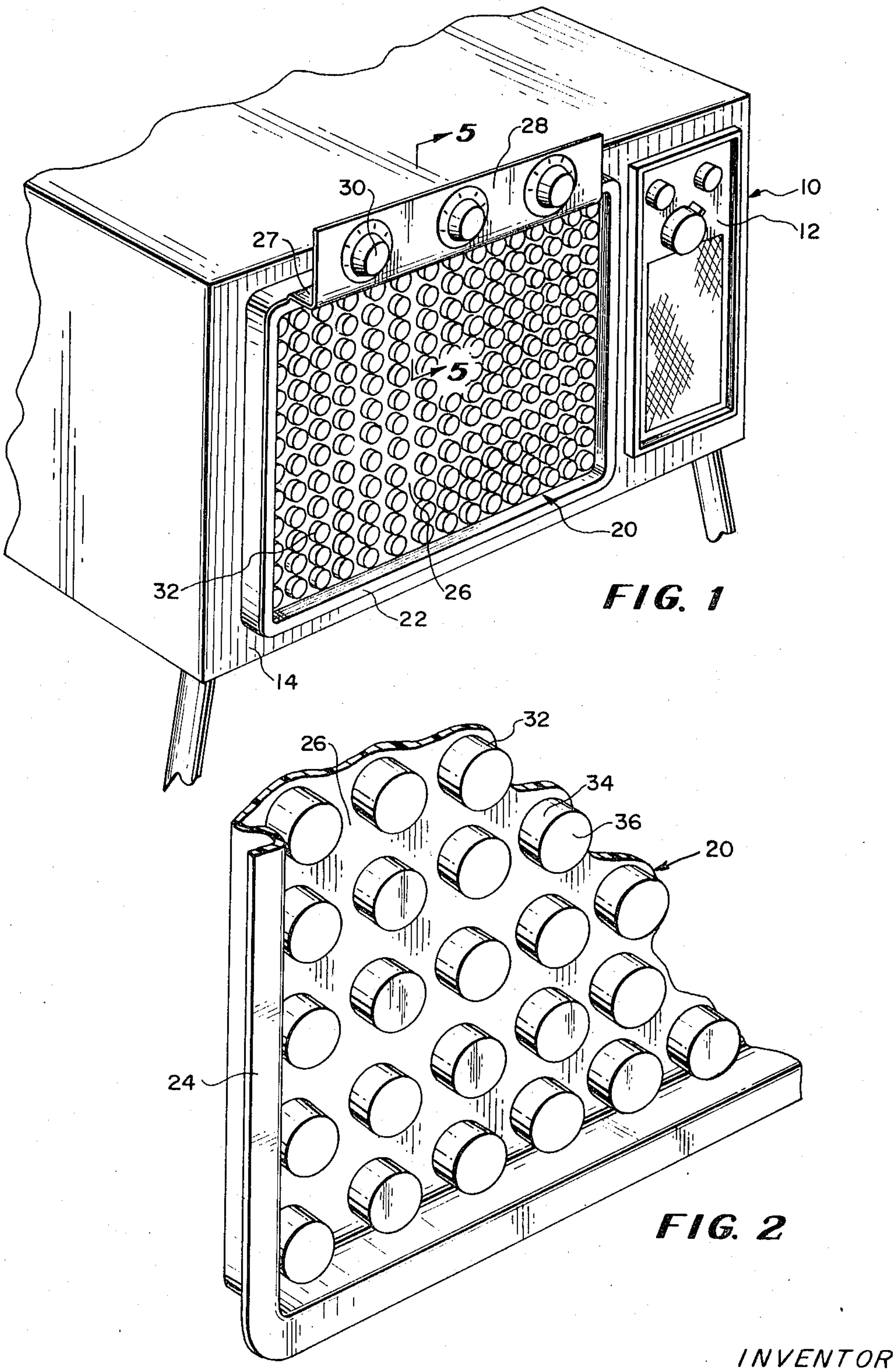
FIG. 1 is a perspective view of a television set with the psychedelic panel of this invention mounted thereon.
FIG. 2 is a fragmentary perspective view of the face side of the panel.

Referring to the drawings, particularly FIG. 1, there is illustrated a television set 10 having the control panel 12 and the cabinet face or panel 14 having the opening 16 (see FIG. 5) in which is mounted the television tube 18. The psychedelic panel or screen 20 of this invention is shown mounted before the television tube 18 and comprises a molded plastic body 22 having the reinforcing edge flange 24 bordering the planar body 26 with the integral projecting flange 27 carrying the upright flange 28 along the top of the set. The flange 28 carries one or more false dials for purposes of appearance and amusement.

The panel 20 can be formed of any suitable essentially opaque sheet material, such as thermoplastics, with a plurality of spaced cylindrical projections 32 on the outer side, each having a side wall 34 and a transverse end or occular wall 36. As shown in FIG. 6, the projections 32 are hollow and the ocular wall 36 is relatively thin in comparison with the side wall 32 or the planar body. Although the side walls 34 as shown to be cylindrical it is apparent that the projections can have any desired cross-sectional configuration. The projections 32 are spaced upon the body 26 in vertical and lateral rows and are substantially equally spaced from each other. The panel 20 can be provided with a suitable offset 38 (see FIG. 5) to engage a trim part 40 of the cabinet face 14 along the top and a similar arrangement can be provided at the bottom to hold the panel 20 upon the set and before the screen. Other means of attachment can be used. The trim member 40 into which the panel 20 snap fits can be continuous around the tube opening so that the offset wall 39 engages peripherally therein.

Figure 3:
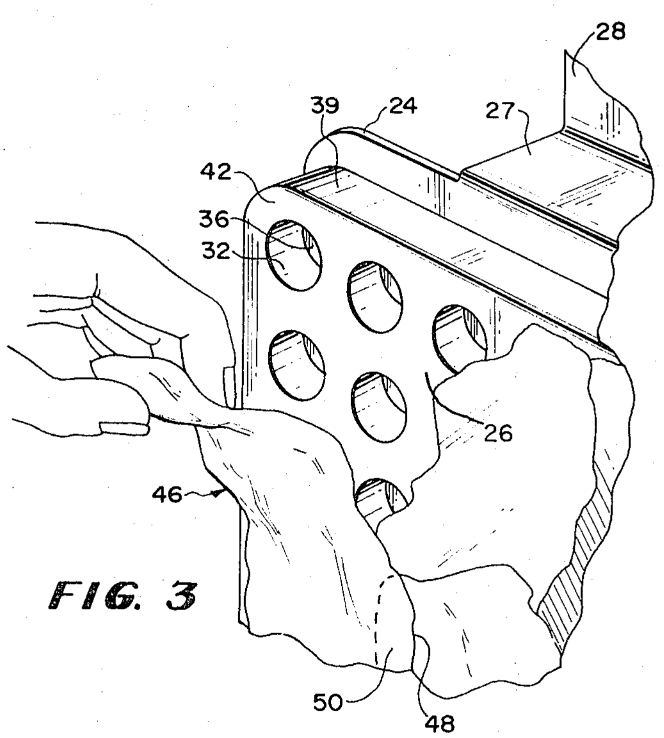
FIG. 3 is an enlarged fragmentary view of the back side of the panel.
Figure 4:
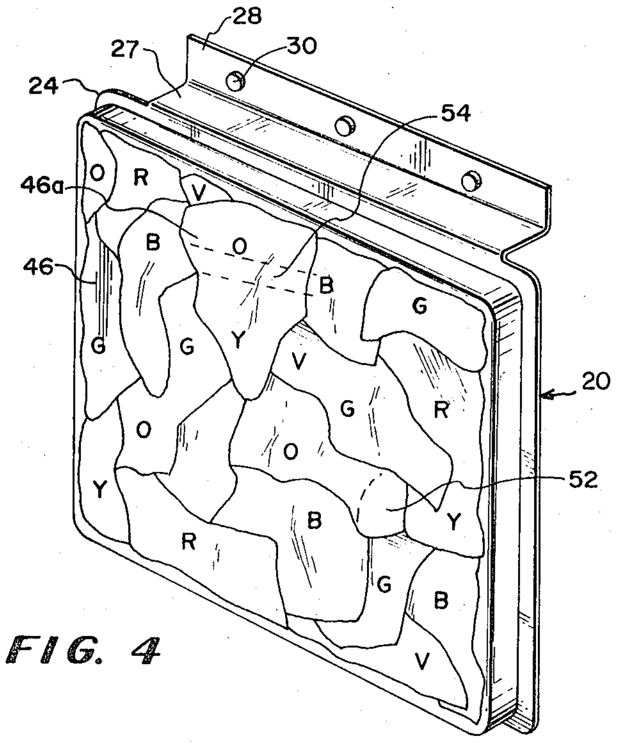
FIG. 4 is a perspective view of the back side of the panel with the color sections indexed.

Referring to FIGS. 3, 4 and 6 it is seen in one embodiment that the body 26 has a planar back side 42 to which are attached by suitable adhesive layer 44 the plurality of translucent or transparent colored panels 46 of different colors of the spectrum. The panels 46 are irregular in shape having jagged or irregular edges 48 and are placed in random positions upon the surface 42 with overlapping portions as indicated at 50. Each panel 46 can be a distinct color in itself or have variations or shades of color. In FIG. 4 an example arrangement is shown wherein the letters B for blue, Y for yellow, O for orange, R for red and V for violet are used as indicia representing the color of the particular panels on which they occur. One or more of the panels 46 can be banded or have more than one color thereon in a simulated spectrum pattern, such as the panel 46a which is orange at the top and yellow at the bottom with an area 50 in between which is a combination of these colors such as green. Any individual color designated need not be the same as any other color indicated to be the same by the letter used. Thus, the orange colors can be different shades or intensities of orange and the blues can all be the same or different shades of blue. The degree of transparency of the panels 46 can vary and at least one area, indicated at 54 can be opaque, or transparent. Instead of using individual panels a single sheet of varied colored material can be used across the entire surface 42.

Instead of using the plurality of panels 46 in a sheet or layer across the back side of the main panel 20 other means for producing different colored light rays from the tube source can be used. Thus, the inside of each ocular wall 36 can receive a disc of colored transparent or translucent paper or the ocular walls 36 can be dyed different colors during the molding process and the colored panels 46 omitted.

Figure 5:
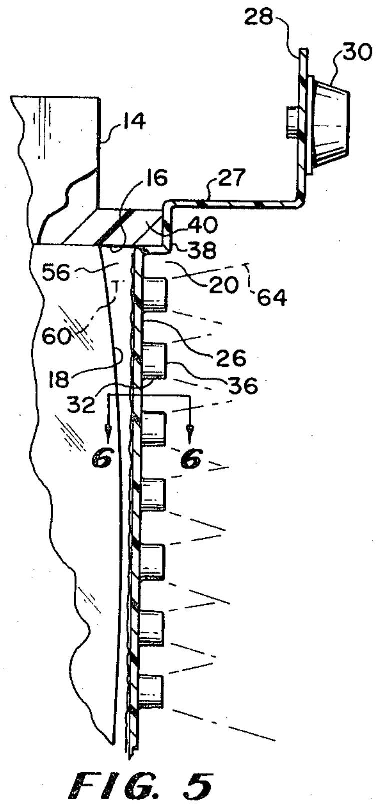
FIG. 5 is a cross-sectional view taken along the lines 5—5 of FIG. 1.
Figure 6:
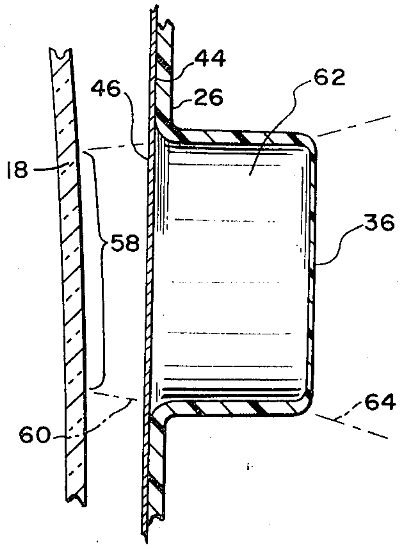
FIG. 6 is an enlarged cross-sectional view taken along the lines 6—6 of FIG. 5.

As seen in FIGS. 5 and 6 the panel 20 is mounted so as to be spaced in front of the colored or black and white television tube 18 as indicated by the spacing 56. The tube, during operation, will have a given area 58 that is directly behind one of the projections 32 and the light 60 transmitted from the tube will pass through the translucent colored panel 46 that is on that part of the larger panel 20 and into the interior 62 and thence through the thin ocular wall 36 as indicated by the Beam 64. It is seen that, as the television tube operates, the area 58 will project different color patterns or different intensities of white light, each of which will be transmitted through the panel 46 and be integrated, mixed, intensified or shaded thereby and lastly be transmitted to the eye of the viewer as the modified psychedelic variable colored light beam 64.

Although the panel 20 illustrated in FIG. 1 has 15 vertical rows of projections 32 with each row containing 12 projections, the invention is not limited to an exact number or arrangement of the surface of the panel. Different shapes of projections can be used, that is the surfaces 36 can be oval, hexagonal, octagonal, square or triangular. Nor do all of the projections on a panel have to be the same shape or size. The pattern shown is merely illustrative An optimum diameter for a television screen measuring approximately 15 inch by 17 inch is about thirteen-sixteenths inch for the projections with about 180 such projections on the panel. The ocular walls 36 are spaced about 1 3/12 inch between centers in one embodiment. The projections are deep enough, about one-half inch, to allow sufficient draught for molding. The main body of the panel 20 is pigmented so as to be essentially opaque. The walls 32, being thicker than the end walls 36 of each projection, will transmit little or no light so that the viewer will see a surface of continuously varied colored dots representing as composite mosaic, variegation, polychrome or melange of the television colors 58–60, and the light through various panels 46. The panel will catch and project the motion of the projected image and at the same time change the color thereof. No one surface or occular 36 will appear the same as any other surface 36 at any given moment, yet at the same time portions of one surface may appear the same as portions of another surface in random display.

The panel 20 can be constructed of any suitable plastic and formed by drape or vacuum molding, generally reformed to a thermoforming. In such a process the sheet material is placed over a suitable mold and heated to its plastic or flowable state. A slight vacuum is applied to the mold cavities or air pressure applied to the sheet to draw or force the plastic sheet into the mold cavities. When held to the shape of the mold and allowed to cool the plastic retains the shape and detail of the mold. Sheet material having a thickness of 0.030 inch can be used. Thermoplastics that can be used include styrenes, acrylics, cellulosics, polyolefins, vinyls, nylons, etc. The sheet material used can be of the extruded, calendared, laminated, compression molded or cast variety. In order to obtain a thinning of the corners and ocular walls 36 so that they will be transparent or translucent, straight vacuum forming or drape forming are preferably used. If less thinning of the occular wall 36 is desired, the vacuum-snap-back method is used. The process variables affecting the appearance, quality, size and material distribution of the formed panel are known in the art to obtain the desired results. In this process the bottom or occular 36 of the projection becomes thinner because it is stretched farthest in conforming to the mold.

The main body of the panel 20 can be made of pigmented thermoplastic sheet material using a variety of known coloring agents or opaque fillers. A suitable opaque color for this purpose is grey although any color can be used. The degree of opaqueness of the main panel 20 and the side walls 32 can be varied but the most interesting psychesthetic effects are obtained with about 90 to 100 percent opaqueness for these parts.

As one embodiment of this invention the panels can be formed without the colored panels 46 for use with colored television sets and panels with the coloring effects can be used with either black and white television sets or colored television sets. The colored panels 46 can be made from colored tissue paper or cellophane. An interesting variation is produced by pigmenting the entire sheet used to form the panel 20 in a primary color such as red, green, blue or violet and yellow, the latter not being technically a primary color. When such a sheet is vacuum drawn the occular walls 36 are thinned and become translucent while the corners per se may be almost transparent. The walls 36 can be formed so that they are thicker in the middle than at the edges to give still another effect. The occular walls 36 can be 0.0003 to 0.003 inch in thickness. The molded panels are produced in different sizes to accommodate different sizes of television sets. The diameters of the projections 32 and consequently their occular walls 36 are optimized so that the original television image represented by the light beam 60 at any one point on the screen is not clearly recognizable. It has been found that if the projections 32 are too small the image can be recognized at least partially, thus destroying the illusion of a random pattern. And if the projections are too large, interest is lost due to a reduction in the pattern elements. Generally a total of about 100 to 200 projections give the proper effect for a given size of screen.

It is apparent from this description that the occular walls 36 can be formed in the plane of the panel 20, that is, without forming the projections 32 therein. Also the panel 20 can be used with the projections facing inwardly toward the television screen, without departing from this invention. A psychesthetic device has been described which is characterized by its ability to convert a moving polychromatic image into a variegated imageless light pattern. The device need only include an essentially opaque panel member of any desired configuration with a plurality of spaced light diffusing occular walls therein. The occular walls are so spaced from each other so that a substantial portion of the projected image is transmitted through the panel. The combined opaque and translucent portions thereof essentially obscure the details of the resulting projected image while transmitting polychromatic variations of that image. The term polychromatic image as used herein is intended to include the images projected by or produced by either the so-called black and white television tubes and colored television tubes since technically the black and white image is polychromatic light being a composite of the light rays in the visible spectrum. For added psychedelic effects either the panel 46 or the ocular surfaces or walls 36 can include a fluorescent material.

What is claimed is:

1. A psychesthetic device characterized by its ability to convert a moving polychromatic image into a progressively changing variegated imageless light pattern comprising:
- a transparent viewing screen illuminated from the rear with a constantly changing image projected therefrom;
- an essentially opaque stationary planar panel member at the face of the screen to intercept said projected image;
- a plurality of spaced light diffusing translucent ocular walls in said opaque panel member transmitting corresponding limited portions of said projected image;
- said ocular walls being spaced and supported from the plane of said panel member by projecting tubular walls and being of a size and so spaced from each other that a substantial portion of said projected image is transmitted through said panel with the combined opacity and translucent portions thereof obscuring the details of said projected image while transmitting polychromatic variations thereof.

2. A psychesthetic device in accordance with claim 1 in which:
- said occular walls are colored;
- and the color of any one wall is different from the color of a neighboring wall.

3. A psychesthetic device in accordance with claim 1 in which:
- said panel member is provided with a layer of light transmitting material on the side toward said projected image in the path of light passing through the ocular walls;
- said light transmitting material having areas of different colored light transmitting properties.

4. A psychesthetic device characterized by its ability to convert a moving polychromatic image on a viewing screen into a variegated imageless light pattern comprising:
- an essentially planar opaque panel member at the face of the screen adapted to intercept said projected image;
- a plurality of spaced light transmitting and image diffusing translucent ocular walls in said panel member;
- said ocular walls being so spaced from each other that a substantial portion of said projected image is transmitted through said panel with the combined opacity and translucent portions thereof obscuring the details of said projected image while transmitting polychromatic variations thereof;
- said ocular walls being spaced and supported from the plane of said panel member by projecting tubular walls;
- said panel member, tubular walls and ocular walls constituting an integral molded piece.

5. A psychesthetic device adapted to be affixed across the viewing screen of a television tube to transform the moving polychromatic image being transmitted therefrom in a variegating psychedelic light pattern comprising:
- an essentially opaque panel member;
- means for affixing said panel member to the face of said television tube in the path of the light therefrom;
- a plurality of projecting tubular members in said panel and spaced across the path of light from said television tube screen;
- said tubular members having transverse translucent ocular walls substantially normal to the path of the light to obscure image delineation while transmitting unintelligible variations thereof;
- and including polychromatic translucent filter means in the path of the light passing through said ocular walls whereby a substantial portion of said projected image is transformed into a diffused variegated imageless light pattern.

6. A psychesthetic device in accordance with claim 5 in which:

said tubular members extend outwardly from the front of said panel member.

7. A psychesthetic device in accordance with claim 5 in which:

said filter means comprises a layer of transparent material having a plurality of different colored areas therein, said areas, being in the path of light passing through said ocular walls.

* * * * *